No. 876,203. PATENTED JAN. 7, 1908.
E. S. LINCOLN.
IGNITION CIRCUIT CONNECTION.
APPLICATION FILED MAY 13, 1907.

2 SHEETS—SHEET 1.

Witnesses:
Aaron F. Randall
Oscar F. Hill

Inventor.
Edwin S. Lincoln,
by Nathan B. Day,
Attorney.

No. 876,203. PATENTED JAN. 7, 1908.
E. S. LINCOLN.
IGNITION CIRCUIT CONNECTION.
APPLICATION FILED MAY 13, 1907.

2 SHEETS—SHEET 2.

Witnesses:
Aaron F. Randall
Oscar F. Hill

Inventor:
Edwin S. Lincoln,
by Nathan B. Day,
Attorney.

UNITED STATES PATENT OFFICE.

EDWIN S. LINCOLN, OF BROOKLINE, MASSACHUSETTS.

IGNITION-CIRCUIT CONNECTION.

No. 876,203.  Specification of Letters Patent.  Patented Jan. 7, 1908.

Application filed May 13, 1907. Serial No. 373,339.

*To all whom it may concern:*

Be it known that I, EDWIN S. LINCOLN, a citizen of the United States, residing at Brookline, in the county of Norfolk and State of Massachusetts, have invented certain new and useful Improvements in Ignition-Circuit Connections, of which the following is a specification.

My invention relates to electrical connections whereby several sources of electric energy, preferably a generator, a storage battery, and a battery of dry cells, may be connected to the ignition circuit of explosive engines for the purpose of supplying electricity thereto, and has for its object to provide a system of interconnecting said sources of electricity by controlling switches so as to bring said sources of electric energy into the desired relations as to each other, and as to the ignition circuit, with a minimum equipment of electric wiring and apparatus.

Figure 1:
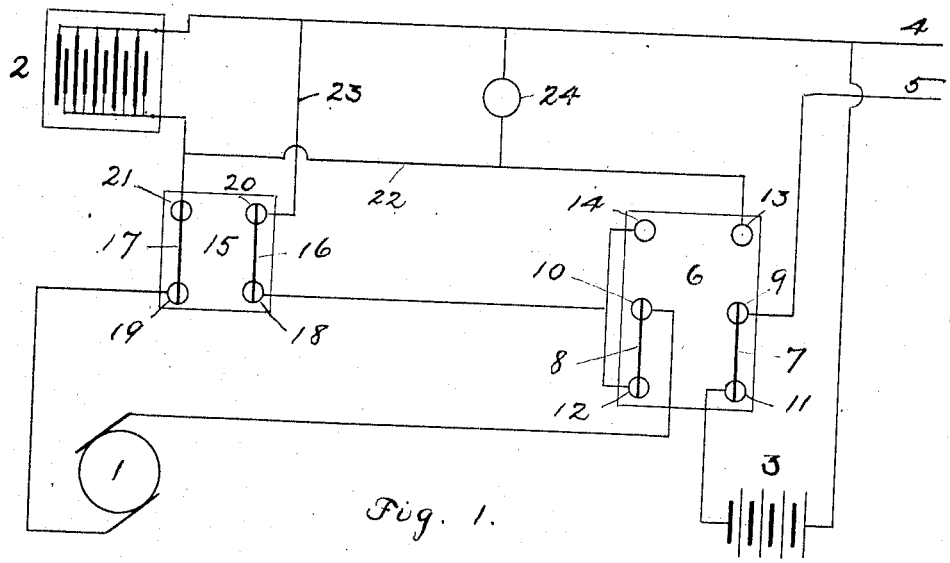
Figure 2:
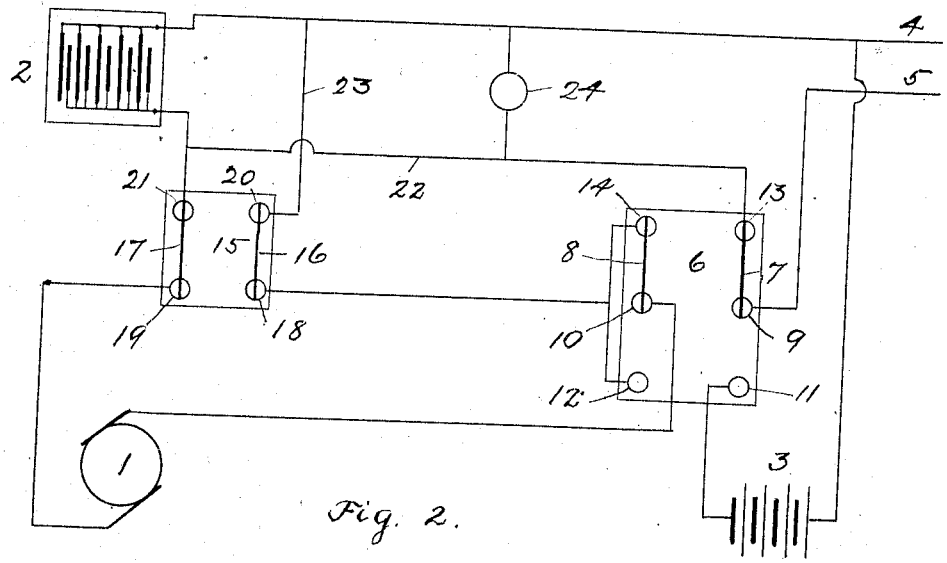
Figure 3:
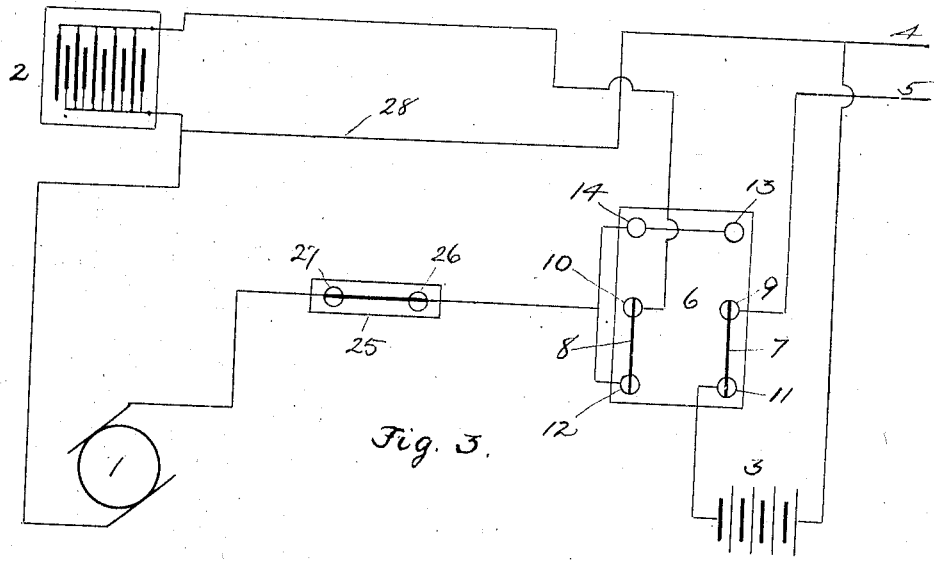
Figure 4:
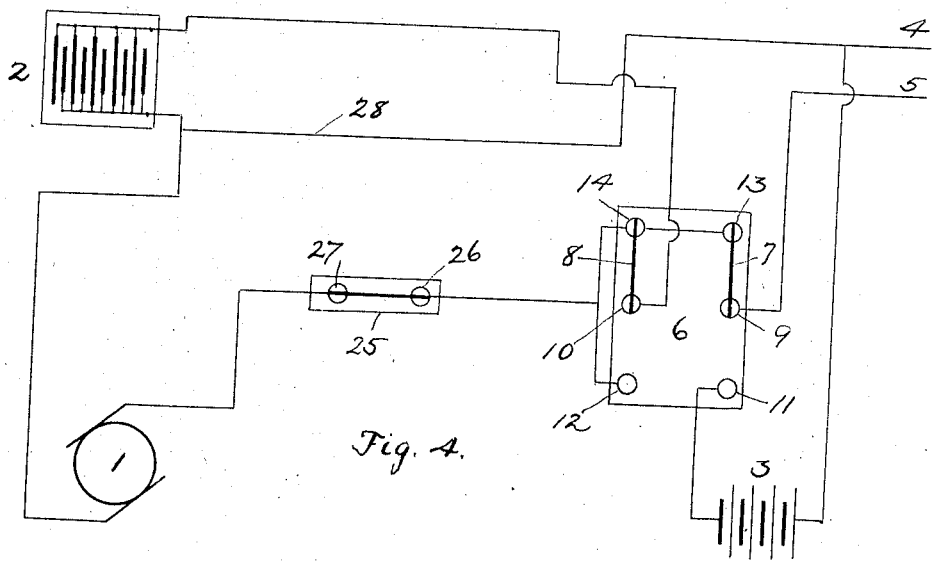

Figures 1 and 2 are diagrammatic views showing the preferred form in which my invention may be embodied, the switch blades of the main controlling switch being shown in their "down" position in Fig. 1, and in their "up" position in Fig. 2. Figs. 3 and 4 are similar views showing another form in which my invention may be embodied.

In said Fig. 1, 1 is an electric generator, preferably adapted to be actuated by the motor whose ignition system it is desired to energize. 2 is a storage battery also adapted to supply electric current to said ignition system, and furthermore designed to be charged by said generator. At 3 is a battery, preferably of dry cells, by which said ignition system may be energized independently of the generator or the storage battery. The terminals of the circuit leading to the ignition system are shown at 4 and 5, one lead preferably connecting with the spark coil, and the other lead being grounded on the motor.

At 6 is shown the main controlling switch, which is preferably of the double pole, double throw, single break type, having the movable conductors or switch blades 7 and 8 pivoted at hinge posts 9 and 10, and respectively engaging in one position of switch with contacts 11 and 12, and in the other position of switch with contacts 13 and 14. The generator switch 15 is preferably of the double pole, single throw, single break type, having switch blades 16 and 17 adapted to connect hinge posts 18 and 19 with contacts 20 and 21.

The wiring by which the main controlling and generator switches are connected to each other and to the generator, dry, and storage batteries, is as follows. Contact 11 is wired to one pole of dry battery 3, its other pole being connected with ignition circuit lead 4. Ignition circuit lead 5 is wired to hinge post 9, and hinge post 10 is connected to one pole of generator 1, the other pole being wired to contact 19 of switch 15. Contact 21 is connected to one pole of storage battery 2 and a branch wire 22 also connects the said pole with contact 13. The other pole of storage battery 2 is wired to lead 4 of the ignition circuit, a branch wire 23 also leading to contact 20. Contact 18 is in electrical connection both with contacts 14 and 12.

The method of operation resulting from the connections as above set forth is as follows. Supposing storage battery 2 to be inert and generator 1, and motor as well, to be at rest, the switch handle is thrown down, causing switch blades 7 and 8 to electrically connect 9 and 11, and 10 and 12, as shown in Fig. 1. This closes the circuit connecting dry battery 3 with the ignition circuit leads; thus energizing the ignition system and supplying current for starting up the motor. When the motor starts up generator 1 will be actuated thereby and will begin to develop electricity for charging the storage battery 2, with which it is in circuit through 10, 8, and 12, switch 15, and wire 23.

When the motor is well started the switch blades may be thrown up into the position shown in Fig. 2. The dry battery 3 is now no longer in circuit with the ignition system, but current will be now supplied thereto from the generator, the circuit to lead 4 being closed by the switch blades 8 and 16, and to lead 5 by switch blades 17 and 7 and wire 22. As in Fig. 1 generator 1 is in charging relation to storage battery 2 through switch blade 8, switch 15 and wire 23, and will supply charging current thereto, simultaneously with energizing current for the ignition system. When the storage battery is charged, as may be shown by voltmeter 24, switch 15 may be opened, and the ignition system supplied by the storage battery alone, one pole being directly wired to lead 4, and the other pole being connected with lead 5 through wire 22 and switch blade 7. The generator may then be disconnected from the motor until the storage battery again requires charging, when it may again be put into operation and switch 15 closed.

It is apparent that contacts 19 and 21 may be permanently connected and a single pole switch used in place of double pole switch 15. Furthermore if desired switch 15 may be actuated by automatic means opening or closing the switch when the voltage of the storage battery exceeds or falls below certain predetermined limits.

Figs. 3 and 4 show another method of interconnecting dry and storage batteries, generator, and main and generator switches. As before, a double pole, double throw, single break switch is used as the main switch 6. The generator switch 25 is shown as of the single pole type. Here, as in Figs. 1 and 2, one pole of dry battery 3 is connected to ignition lead 4, the other pole being wired to contact 11. Ignition lead 5 is connected to hinge post 9. Contacts 12, 13 and 14 are electrically interconnected with each other, and to contact 26 of generator switch 25. The other switch contact 27 leads to one pole of generator 1, the other pole of the same being wired to one pole of storage battery 2, a branch wire 28 also connecting the same with ignition lead 4. The other pole of the storage battery is wired to hinge post 10.

Switch 25 being closed, and switch blades 7 and 8 of switch 6 respectively connecting contacts 9 and 11, and 10 and 12, as in Fig. 3, it will be seen that, as Fig. 1, the dry battery is connected into the ignition system circuit, and that generator 1 is simultaneously placed in charging relation to the storage battery, the circuit being completed through switch 25 and switch blade 8 of switch 6. In the other position of the switch 6, where the blades are up, occupying the position shown in Fig. 4, the generator 1 is placed in charging relation to storage battery 2 through blade 8 and switch 25, being also adapted simultaneously to supply energizing current to the ignition circuit leads; the circuit in case of lead 4 being through wire 28, and in case of lead 5 through switch 25 and blade 7 of switch 6. As before switch 25 may be opened when storage battery 2 is charged, and electricity may be then supplied to the ignition system from the storage battery alone, lead 4 being directly connected with one pole thereof through wire 28, and lead 5 being connected with the other pole of said storage battery through switch blades 7 and 8.

It is apparent that in place of dry battery 3 may be used a source of electric energy of any desired nature whatever, so long as it be capable of energizing the ignition circuit independently of either the storage battery or generator. Furthermore there may be used in place of the storage battery any type of secondary cell adapted to accumulate electric energy delivered thereto by the generator.

For the sake of brevity the switch contacts, hinge posts, and movable conductors or switch blades are in the claims collectively referred to under the term "switch elements".

Having described my invention, I claim,

1. In an ignition system for explosive engines or the like, in combination with an electric generator, a secondary cell adapted to be charged thereby, and a source of electric energy independent of either generator or secondary cell; an electric switch having movable conductors adapted to occupy selective operative positions, and electric connections between said generator, secondary cell, and independent source of electric energy, and the switch elements, whereby in one operative position of conductors said independent source of electric energy is placed in circuit with the ignition circuit, and the generator is placed in charging relation to the secondary cell, and whereby in the other operative position of conductors the generator is placed in charging relation to the secondary cell, and both generator and secondary cell are connected in parallel to the ignition circuit.

2. In an ignition system for explosive engines or the like in combination with an electric generator, a secondary cell adapted to be charged thereby, and a source of electric energy independent of either; an electric switch having movable conductors adapted to occupy selective operative positions, and electric connections between said generator, secondary cell, and independent source of electric energy, and the switch elements, whereby in one operative position of conductors said independent source of energy is placed in circuit with the ignition circuit, and the generator is placed in charging relation to the secondary cell, and whereby in the other operative position of conductors the generator is placed in charging relation to the secondary cell, and both generator and secondary cell are connected in parallel to the ignition circuit, and a second electric switch whereby the charging relation between generator and secondary cell may be interrupted.

3. In an ignition system for explosive engines and the like, in combination with a generator, a storage battery, and a primary cell; a double pole electric switch having movable conductors adapted to occupy two operative positions, and electric connections between generator, storage battery, and primary cell, and the switch elements, whereby in one position of conductors the primary cell is placed in circuit with the ignition system, and the generator is placed in charging relation to the storage battery, and whereby in the other position of the conductors the generator is placed in charging relation to the storage battery, and both generator and storage battery are connected in parallel to the ignition circuit.

In testimony whereof I affix my signature in presence of two witnesses.

EDWIN S. LINCOLN.

Witnesses:
NATHAN B. DAY,
CHAS. F. RANDALL.